United States Patent
Sun et al.

(10) Patent No.: US 11,762,275 B2
(45) Date of Patent: Sep. 19, 2023

(54) PROJECTION SCREEN AND PROJECTION SYSTEM

(71) Applicant: APPOTRONICS CORPORATION LIMITED, Guangdong (CN)

(72) Inventors: Wei Sun, Guangdong (CN); Lin Wang, Guangdong (CN); Zeda Tang, Guangdong (CN); Fei Hu, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 200 days.

(21) Appl. No.: 17/291,261

(22) PCT Filed: Sep. 26, 2019

(86) PCT No.: PCT/CN2019/108002
§ 371 (c)(1),
(2) Date: May 4, 2021

(87) PCT Pub. No.: WO2020/093805
PCT Pub. Date: May 14, 2020

(65) Prior Publication Data
US 2021/0389658 A1  Dec. 16, 2021

(30) Foreign Application Priority Data
Nov. 5, 2018 (CN) .......................... 201811306482.8

(51) Int. Cl.
*G03B 21/60* (2014.01)
*G02B 5/00* (2006.01)
(Continued)

(52) U.S. Cl.
CPC ............. *G03B 21/60* (2013.01); *G02B 5/003* (2013.01); *G02B 5/0221* (2013.01); *G03B 21/602* (2013.01)

(58) Field of Classification Search
CPC ...... G03B 21/60; G03B 21/56; G03B 21/602; G02B 5/0221; G02B 5/003; G02B 5/122; G02B 5/12; G02B 5/0284; G02B 5/0231
See application file for complete search history.

(56) References Cited

U.S. PATENT DOCUMENTS 1,568,023 A * 12/1925 McManus ............... G03B 21/60
                                                      359/459
4,767,186 A *  8/1988 Bradley, Jr. ............ H04N 9/31
                                                      359/452
(Continued)

FOREIGN PATENT DOCUMENTS

CN    103809357 A    5/2014
CN    105408777 A    3/2016
(Continued)

OTHER PUBLICATIONS

ISA China National Intellectual Property Administration, International Search Report Issued in Application No. PCT/CN2019/108002, dated Jan. 3, 2020, WIPO, 6 pages.

*Primary Examiner* — Christopher E Mahoney
(74) *Attorney, Agent, or Firm* — McCoy Russell LLP

(57) ABSTRACT

A projection screen and a projection system. The projection screen includes a reflection layer and a light absorption layer for absorbing light which are sequentially arranged from an incident side of projection light; the reflection layer comprises multiple microstructure units; each microstructure unit comprises a first plane and a second plane which are opposite to each other at an angle in a first direction as well as a third plane and a fourth plane which are opposite to each other at an angle in a second direction.

20 Claims, 14 Drawing Sheets

(51) Int. Cl.
*G03B 21/602* (2014.01)
*G02B 5/02* (2006.01)

(56) References Cited

U.S. PATENT DOCUMENTS

| | | | |
|---|---|---|---|
| 5,903,392 A | 5/1999 | Kojima et al. | |
| 10,656,513 B2* | 5/2020 | Zhou | G03B 21/602 |
| 11,194,243 B2* | 12/2021 | Wang | G03B 21/602 |

FOREIGN PATENT DOCUMENTS

| | | |
|---|---|---|
| CN | 106406012 A | 2/2017 |
| CN | 207148517 U | 3/2018 |
| CN | 207216263 U | 4/2018 |
| CN | 207663208 U | 7/2018 |

* cited by examiner a b

PROJECTION SCREEN AND PROJECTION SYSTEM

CROSS REFERENCE TO RELATED APPLICATIONS

The present application is a U.S. National Phase of International Application No. PCT/CN2019/108002 entitled "PROJECTION SCREEN AND PROJECTION SYSTEM," and filed on Sep. 26, 2019. International Application No. PCT/CN2019/108002 claims priority to Chinese Patent Application No. 201811306482.8 filed on Nov. 5, 2018. The entire contents of each of the above-listed applications are hereby incorporated by reference for all purposes.

TECHNICAL FIELD

The present disclosure relates to a projection screen and a projection system. Specifically, the present disclosure relates to a projection screen with high contrast applied to a long-focus projector and an ultra-short-focus projector, and a projection system using the projection screen.

BACKGROUND AND SUMMARY

In recent years, as brightness of a projector is improved continuously, advantages of projection display systems in large-size home theater applications have begun to manifest. Compared with LCD (Liquid Crystal Display) TVs and OLED (Organic Light-Emitting Diode) TVs, the projection display system is small in size, easy to install, and may easily provide a display screen larger than 100 inches. Moreover, the entire system has a relatively low cost.

According to different throw ratios, projectors can be divided into long-focus projectors and short-focus projectors. The long-focus projector is traditional projector. This projector usually requires a distance of more than 3 meters to project an 80-inches screen. Therefore, projection screen used with the long-focus projector generally only needs to consider projection light incident at a small angle. However, due to limited indoor space, it is often difficult for long-focus projectors to project large projection screen indoor, so short-focus and ultra-short-focus projectors have emerged. For example, the ultra-short-focus projectors on current market can project a more than 80-inches screen at a distance of less than 1 meter. Therefore, projection screens used with short-focus and ultra-short-focus projectors need to be designed for large-angle projection light.

For example, as shown in FIG. 1, the patent document U.S. Pat. No. 5,903,392A discloses a screen with isosceles triangular prism microstructure 13. Specifically, the screen includes a first sheet 10 and a second sheet 20. The first sheet 10 includes a light diffusion layer 12, a transparent substrate 11 and a prism microstructure 13. There is a gap portion 14 between the first sheet 10 and the second sheet 20. In a cross section shown in view a of FIG. 1, the isosceles hypotenuses P and Q of the prism microstructure 13 form an apex angle α. The prism microstructure extends along the up and down direction of the screen. Since the prism microstructure 13 has a cross-section of isosceles triangle, the screen is merely suitable for a long-focus projector that emits projection light incident at a small angle (shown as I in view a of FIG. 1).

In addition, as shown in FIG. 2, the patent document CN105408777A discloses a circularly symmetrical Fresnel optical screen structure for an ultra-short-focus projector. Array microstructures of the screen consists of a lens surface 32 and a non-lens surface 33. An angle between the lens surface 32 and a plane of the screen is less than an angle between the non-lens surface 33 and the plane of the screen. FIG. 2 shows the light paths of a projection light ray L1 and ambient light rays G1 and G2 incident at a larger angle. The projection light ray L1 is merely incident on the lens surface 32 with a small angle, and the light rays incident on the lens surface 32 are reflected to the viewer side by a reflective layer 20 composed of a plurality of metal thin films 25 laminated on the surface. It is not difficult to find from FIG. 2 that due to the angles of the lens surface 32 and the non-lens surface 33, the screen is only suitable for the ultra-short-focus projector located below the screen.

It can be seen from the above that, because the long-focus projector and the ultra-short-focus projector require screens with different optical structures, the long-focus projector and the ultra-short-focus projector cannot share a same screen in the prior art. The user's use cost is increased and the space utilization rate is reduced.

In addition, in a home application environment, a projection display system is often installed in a living room. The living room usually has good natural lighting conditions and bright lighting sources, so there is a lot of ambient stray light. A general projector screen can reflect both the light from the projector and the light from the ambient light. In such an environment, due to the influence of ambient light, the contrast of the screen formed by the light reflected by the projection screen is much lower than the contrast of the projector itself.

SUMMARY

In view of the above-mentioned problems, the present disclosure is desirable to provide a projection screen and a projection system with high contrast which can be shared by a long-focus projector and an ultra-short-focus projector.

An embodiment of the present disclosure includes a projection screen, which includes a reflective layer and a light absorption layer for absorbing light, which are provided in sequence from an incident side of projection light. The reflective layer includes a plurality of microstructure units, and each of plurality of the microstructure units includes a first plane and a second plane that are obliquely opposite in a first direction, and a third plane and a fourth plane that are obliquely opposite in a second direction. The first plane and the second plane are arranged with inclination angles relative to a screen plane of the projection screen such that at least a part of the projection light incident at a first incident angle within a first angle range is reflected at the first plane and the second plane to enter into a field of view of a viewer. The third plane and the fourth plane are arranged with inclination angles relative to a screen plane of the projection screen such that at least a part of the projection light incident at a second incident angle within a second angle range is reflected at the third plane and the fourth plane to enter into the field of view of the viewer. The first incident angle is less than the second incident angle.

Another embodiment of the present disclosure provides a projection system, the projection system includes the projection screen as described above and a projector. For example, the projector is a long-focus projector, the projection light from the long-focus projector is incident onto the projection screen at the first incident angle within the first angle range. Alternatively, the projector is a short-focus or an ultra-short-focus projector located below the projection screen, and the projection light from the short-focus projector or the ultra-short-focus projector is incident onto the projection screen at the second incident angle within the second angle range.

DETAILED DESCRIPTION

Figure 1:
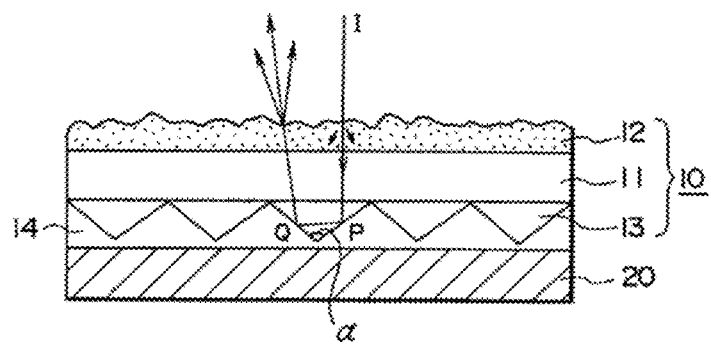
FIG. 1 illustrates a cross section of a projection screen in prior art.
Figure 2:
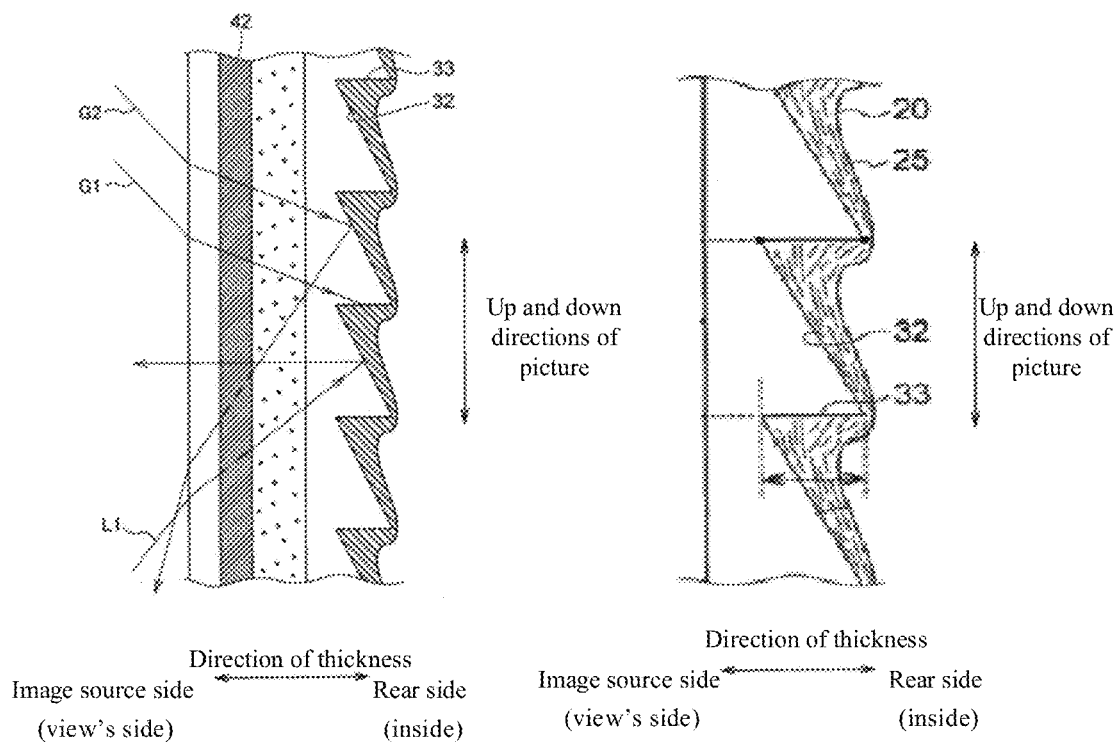
FIG. 2 illustrates a cross section of a projection screen in prior art.

Hereinafter, specific embodiments according to the present disclosure will be described in detail with reference to the accompanying drawings. It should be emphasized that all dimensions in the drawings are only schematic and are not necessarily illustrated in real scale, so are not intended for limitation. For example, it should be understood that the thickness, thickness ratio, and angle of each layer in each layer structure in a projection screen are not shown in accordance with actual size and ratio, but only for convenience of illustration.

As will be explained in detail below, a projection screen according to an embodiment of the present disclosure is provided with microstructure units with opposite first and second planes and opposite third and fourth planes. The projection screen may form a projection system with a long-focus projector, or with a short-focus projector or an ultra-short-focus projector. The projection screen has high contrast and good anti-ambient light effects. In addition, when the projection screen according to the embodiment of the present disclosure is used in a short-focus or an ultra-short-focus projector, the projection screen can obtain a larger horizontal viewing angle; when the projection screen according to the embodiment of the present disclosure is used in a long-focus projector, the projection screen can obtain a larger vertical viewing angle.

1 A First Embodiment 1.1 Overview Of Structure

Figure 3:
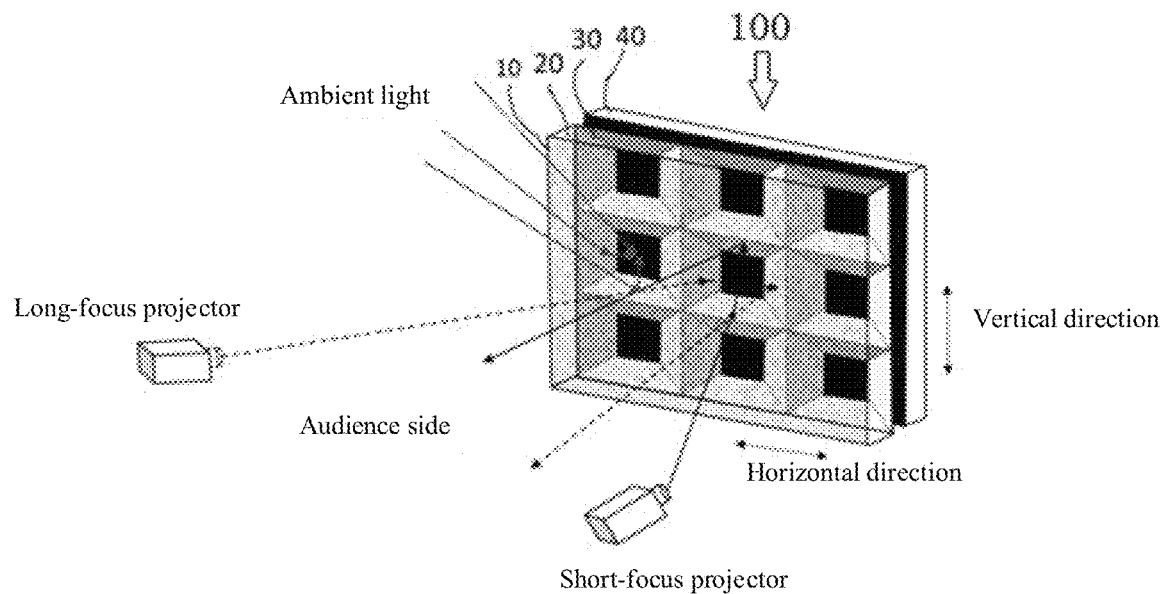
FIG. 3 illustrates a perspective view of an exemplary structure of a projection screen, according to a first embodiment of the present disclosure.

FIG. 3 illustrates a structural schematic diagram of a projection screen according to the first embodiment of the present disclosure. As shown in FIG. 3, from the audience side, i.e., an incident side of projection light, the projection screen 100 may include a light diffusion layer 10, a substrate layer 20, a reflective layer 30, and a light absorption layer 40 which are sequentially stacked. The reflective layer 30 may be provided with a plurality of microstructure units, and these microstructure units may be arranged in a two-dimensional manner to form a microstructure unit array. The microstructure unit may be formed on a side of the substrate layer 20 away from the audience side through roll to roll coating resin process and a UV curing process. In other words, the reflective layer 30 and the substrate layer 20 may be integrally formed. Light can sequentially pass through the light diffusion layer 10 and the substrate layer 20 to the reflective layer 30. As explained in detail below, a part of the light that reached the reflective layer 30 may be continuously reflected in the reflective layer 30 and exit toward a field of a viewer's view, while another part may pass through the reflective layer 30 to be absorbed by the light absorption layer 40 or may be reflected toward a direction outside the field of the viewer's view by the reflective layer 30. Hereinafter, a light incident side of the projection screen 100 is referred to as an outer side of a screen, a light absorption layer side is referred to as an inner side of the screen.

The light diffusion layer 10 may be used to diffuse the collimated light beam reflected from the reflective layer 30, so that the projection screen 100 may provide a larger viewing angle. It should be noted that, in FIG. 3, in order to conveniently show layers located at the inner side of the screen, an illustration of the light diffusion layer 10 is simplified. In addition, a protective layer to prevent scratches or chemical corrosion, a colored layer made of a dark color material, or an anti-reflection layer may be added to the outside of the light diffusion layer 10 as needed. Of course, other auxiliary function layers may also be provided as needs. The light absorption layer 40 can absorb the light beam irradiated thereon. For example, the light absorption layer 40 may be a black light absorption layer.

Figure 4:
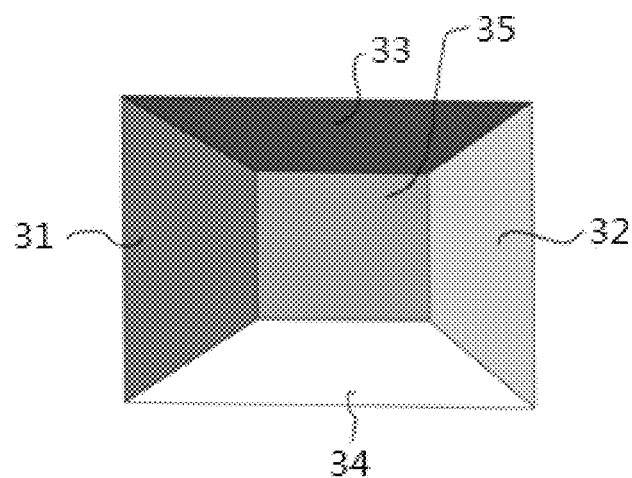
FIG. 4 illustrates a structural schematic diagram of a reflective unit of a projection screen, according to a first embodiment of the present disclosure.

As shown in FIG. 3, a plurality of reflective microstructure units may be formed on the side of the substrate layer 20 away from the audience side. These microstructure units may be arranged in a microstructure unit array in a vertical direction and a horizontal direction. FIG. 4 shows a specific structure of each microstructure unit viewed in a direction perpendicular to a screen plane. As shown in FIG. 4, each microstructure unit may have a pair of reflective planes 31 and 32, respectively referred to a first plane and a second plan, obliquely and oppositely provided in a horizontal direction, the horizontal direction is referred to a first direction; and a pair of reflective planes 33 and 34, respectively referred to as a third plane and a fourth plane, obliquely opposite in the vertical direction, the vertical direction is referred to as a second direction. Four reflective planes all face the audience side obliquely. The reflective planes 31 and 32 and the reflective planes 33 and 34 intersect with a light absorption plane 35 that is parallel to the screen plane on the side away from the audience. In other words, the reflective planes 31 and 32, the reflective planes 33 and 34, and the light absorption plane 35 together form a shape of trapezoidal truncated pyramid, i.e., a shape of truncated quadrangular pyramid. Inclination angles of the reflective planes 31 and 32 obliquely opposite to each other in the horizontal direction may be set for a projection light ray from the long-focus projector which is usually incident at an incident angle within a first angle range, and wherein the incident angle within the first angle range is a first incident angle of the present disclosure, and thus, the reflective planes 31 and 32 may be mainly used to reflect the projection light ray of the long-focus projector. Inclination angles of the reflective planes 33 and 34 obliquely opposite to each other in the vertical direction may be set for a projection light ray from the short-focus or ultra-short-focus projector that may be usually incident at an incident angle within a second angle range, and wherein the incident angle within a second angle range is a second incident angle of the present disclosure, and thus, the reflective planes 33 and 34 may be mainly used to reflect the projection light ray of short-focus or ultra-short-focus projectors. It is easy to understand that the incident angle within the first angle range is obviously smaller than the incident angle within the second angle range. The light absorption plane 35 may be in contact with the light absorption layer 40, and light incident on the light absorption plane 35 can be absorbed by the light absorption layer 40 mostly without being reflected again.

In an embodiment, as explained in detail below, the reflective layer 30 may be a total reflective layer. In other words, the microstructure unit in the reflective layer 30 may be a total reflective microstructure unit. The projection light ray from the long-focus projector incident on the reflective layer 30 can be respectively totally reflected twice on the reflective planes 31 and 32, and then exit toward the audience side and incident into the audience's view field. In contrast, when ambient light rays are incident on the reflective layer 30, it is difficult to achieve total reflection on any of the reflective planes 31 to 34. The ambient light rays may be either directly incident through the reflective layer 30 to the light absorption layer 40 to be absorbed, or firstly reflected to the light absorption plane 35, and then pass through the reflective layer 30 to be absorbed by the light absorption layer 40. In another embodiment, the reflective layer 30 may be a specular reflective layer. In other words, the microstructure unit in the reflective layer 30 may be a specular reflective unit. For example, the specular reflective layer can be formed by plating a reflective material such as metal on the reflective planes 31 to 34. It should be understood that the specular reflective layer here can be set with different transmissivities according to different light rays as needs. The projection light ray from the long-focus projector incident on the reflective layer 30 can be respectively reflected twice on the reflective planes 31 and 32, and then exit toward the audience side, and incident into the audience's view field. The projection light ray from the short-focus or ultra-short-focus projector incident on the reflective layer 30 can be respectively reflected twice on the reflective planes 33 and 34, and then exit toward the audience side, and incident into the audience's view field. In contrast, when the ambient light rays are incident on the reflective layer 30, a part of the ambient light rays may be reflected out of the audience's view field, a part of the ambient light rays may be reflected to the light absorption plane 35 to be absorbed by the light absorption layer 40 through the reflective layer 30, and another part of the ambient light rays may be pass through the reflective layer 30 to be absorbed by the absorption layer 40.

It can be seen from the above that the projection screen 100 according to the first embodiment of the present disclosure can form a projection system with a long-focus projector, or form a projection system with a short-focus projector or an ultra-short-focus projector, which is provided with high contrast and good anti-ambient light effect.

1.2 Optical Principle and Arrangement of Reflective Microstructure Unit

As described above, the microstructure unit of the projection screen according to the present disclosure may be, for example, a total reflective microstructure unit or a specular reflective microstructure unit. Hereinafter, the optical principle of the reflective microstructure unit will be described in detail with reference to FIGS. 5 to 12 when the microstructure unit of the projection screen 10 according to the first embodiment of the present disclosure is a total reflective microstructure unit. It should be noted that in some of the above drawings, the illustration of the light diffusion layer 10 and the light absorption layer 40 is omitted for convenience.

Figure 5:
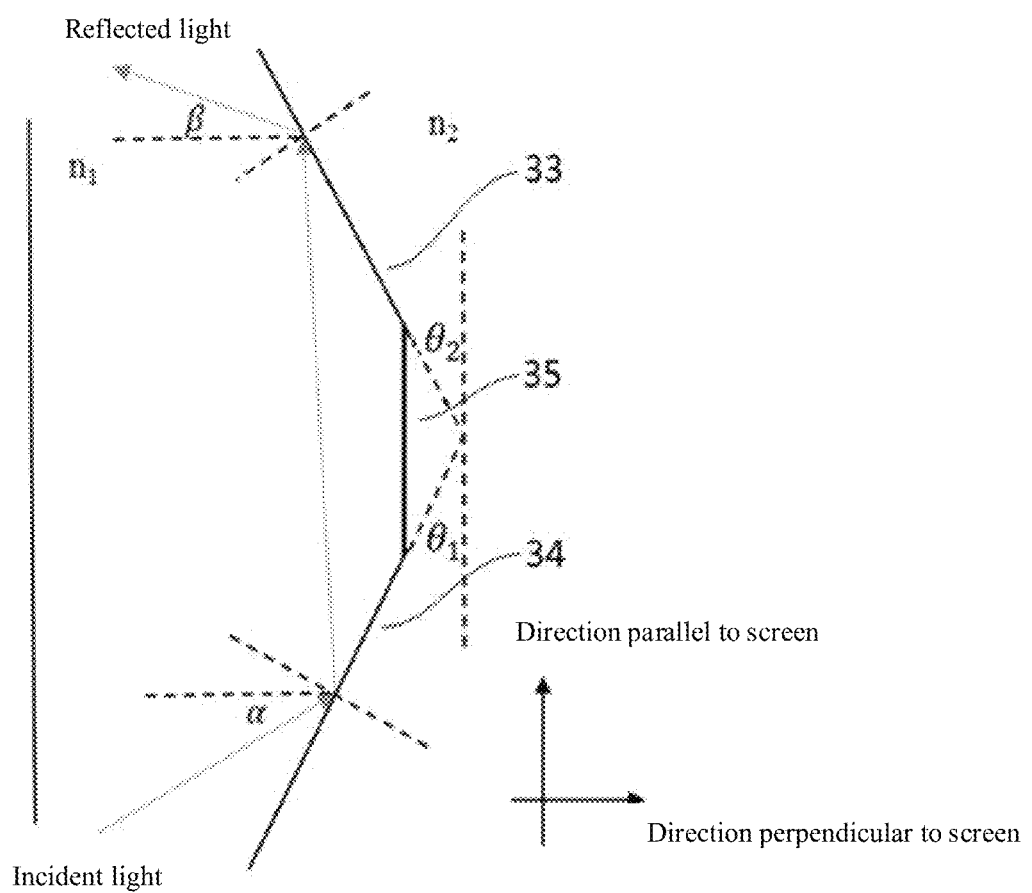
FIG. 5 illustrates a schematic diagram of a reflected light path of projection light on reflective planes of microstructure units obliquely and oppositely provided in a vertical direction, when a projection screen according to a first embodiment of the present disclosure is used in an ultra-short-focus projector.

1.2.1 Arrangement and Function of Opposite Reflective Planes in the Vertical Direction FIG. 5 illustrates a schematic diagram of a reflected light path of the projection light on the reflective planes 33 and 34 of the microstructure unit when the projection screen 100 is used in a short-focus projector.

As shown in FIG. 5, assuming that a refractive index of the reflective layer 30 is $n_1$, a refractive index of a layer located at an inner side of the reflective layer, such as a spacer layer described in detail below, is $n_2$. Obviously, $n_2$ should be less than $n_1$. An angle between the reflective plane 33 of the microstructure unit and the vertical direction, i.e., a direction parallel to the screen plane, is $\theta_1$, and an angle between the reflective plane 34 of the microstructure unit and the vertical direction is $\theta_2$, wherein the reflective planes 33 and 34 are obliquely and oppositely provided in the vertical direction, and the units of $\theta_1$ and $\theta_2$ are degrees and the same below. Assuming that an incident light ray from the short-focus projector below the screen can be respectively reflected twice in the reflective planes 34 and 33, and finally exit toward the audience side. An angle between the incident light ray and the horizontal direction, i.e., a direction perpendicular to the screen plane, is $\alpha$, and an angle between the reflected light and the horizontal direction is $\beta$, wherein the units of $\alpha$ and $\beta$ are degrees, and the same below. When the reflected light exit horizontally, $\beta$ is obviously 0 degree. According to the principles of geometric optics and the optical reflection conditions, the following formulas (1)~(3) must be satisfied:

$$\theta_1 + \theta_2 = \frac{180 - (\alpha + \beta)}{2} \quad (1)$$

$$\cos(\theta_1 + \alpha) < \sqrt{1 - \left(\frac{n_2}{n_1}\right)^2} \quad (2)$$

$$\cos(\theta_2 + \beta) < \sqrt{1 - \left(\frac{n_2}{n_1}\right)^2} \quad (3)$$

Figure 6:
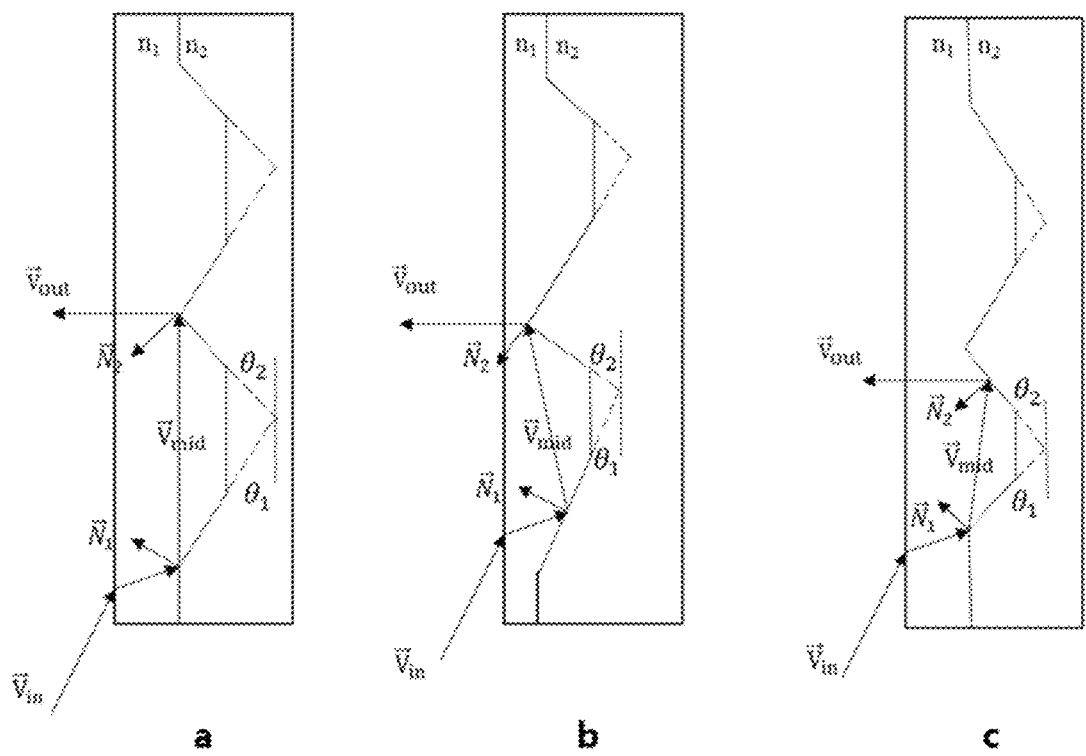
FIG. 6 illustrates a schematic diagram of a light path of an intermediate light, when a projection screen according to a first embodiment of the present disclosure is used in an ultra-short-focus projector.
Figure 7:
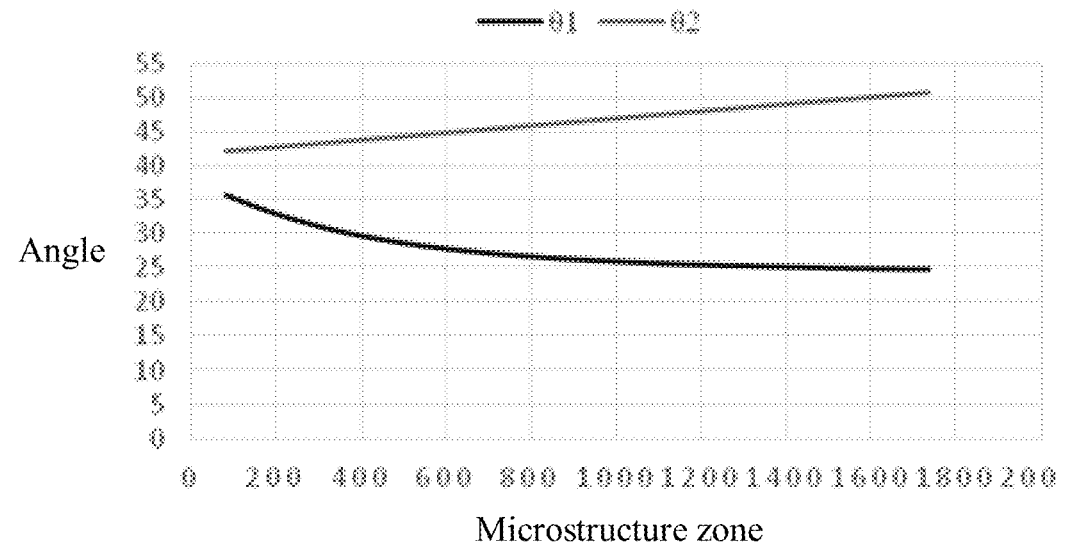
FIG. 7 including a and b, respectively illustrates examples of inclination angles of reflective planes and an included angle of reflective planes, obliquely and oppositely provided in a vertical direction, of a microstructure unit of a projection screen, according to the present disclosure.
Figure 7:
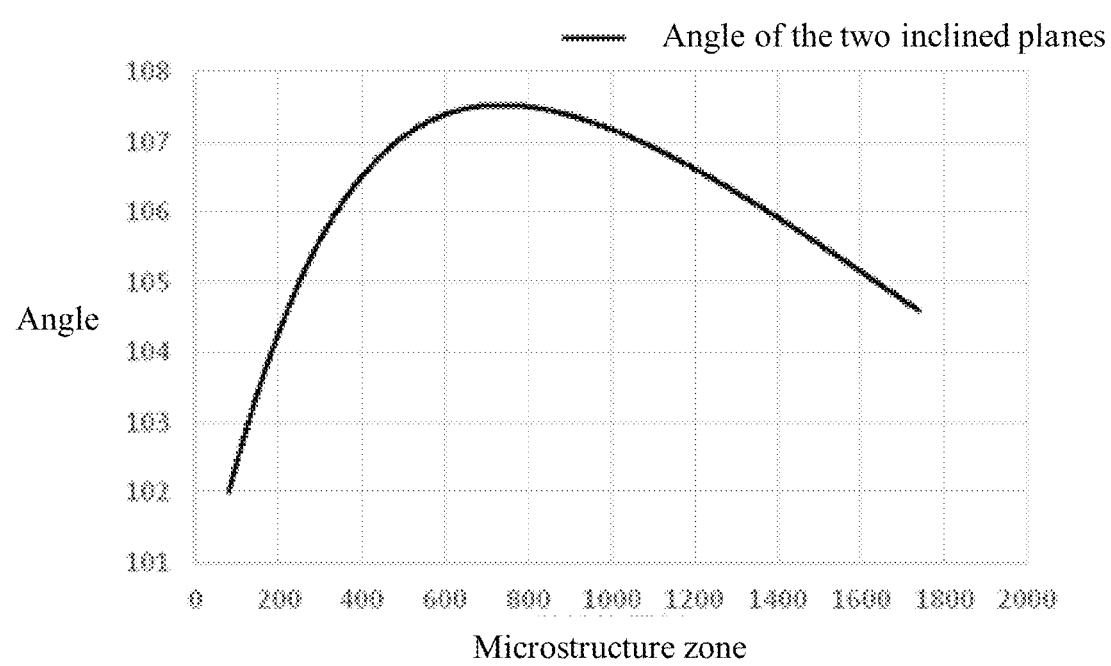

Based on the above formulas (1) to (3), the values of $\theta_1$ and $\theta_2$ cannot be completely determined, and a certain degree of design freedom may be reserved. FIG. 6 shows examples of three light paths of the light ray $V_{mid}$, i.e., an intermediate light between the incident light ray and the exit light ray, traveling between the reflective planes 34 and 33. In view a of FIG. 6, a propagation direction of the intermediate light ray $V_{mid}$ may be parallel to the screen plane, and the incident light ray incident on the lower inclined plane 34 can be completely reflected by the upper inclined plane 33. In view b of FIG. 6, the propagation direction of the intermediate light ray $V_{mid}$ may be toward the audience side, and only a part of the intermediate light ray $V_{mid}$ outgoing from the lower inclined plane 34 can be reflected by the upper inclined plane 33. In c of FIG. 6, the propagation direction of the intermediate light ray $V_{mid}$ may be away from the audience side. The intermediate light ray $V_{mid}$ outgoing from the lower inclined plane 34 can be reflected by the upper inclined plane 33, but a part of the lower inclined plane 34 cannot be utilized.

From the above formulas (1) to (3) combined with the above analysis, it can be seen that as long as the light paths of the incident light ray, the outgoing light ray and the intermediate light ray are determined, i.e., $\alpha$, $\beta$ and directions of the intermediate light ray are determined, the inclination angles $\theta_1$ and $\theta_2$ of the two inclined planes 33 and 34 of the microstructure unit for reflecting the projection light from the short-focus projector can be obtained. In the application with ultra-short-focus projection, the projector may be located below the screen, so $\alpha>0$ is always valid; and the audience's eyes are above the projector. In order to ensure the outgoing light ray incident into the audience's eyes, $\alpha+\beta>0$ is also always valid; and in this case, from formula (1) it can be derived:

$$\theta_1 + \theta_2 < 90 \quad (4)$$

It can be seen from formula (4) that in order to enable a light beam from the short-focus projector to be reflected twice in succession on the two inclined planes 33 and 34 of the microstructure unit of the projection screen according to the first embodiment of the present disclosure, the angle formed by the inclined planes 33 and 34 must be an obtuse angle. Further, considering that the refractive index of common material of reflective layer is 1.4 to 1.65, in order to ensure that the screen can project the projection light within the audience's view field, the angle range between the two inclined planes 33 and 34 in the vertical direction may be preferably 101° to 110°. In a simulated experiment, for example, if the refractive index of the reflective layer is set to be 1.53, the obtained angles of θ1 and θ2 may be shown in view a of FIG. 7, and the angle between the inclined planes 33 and 34 may be shown in b f FIG. 7.

Figure 8:
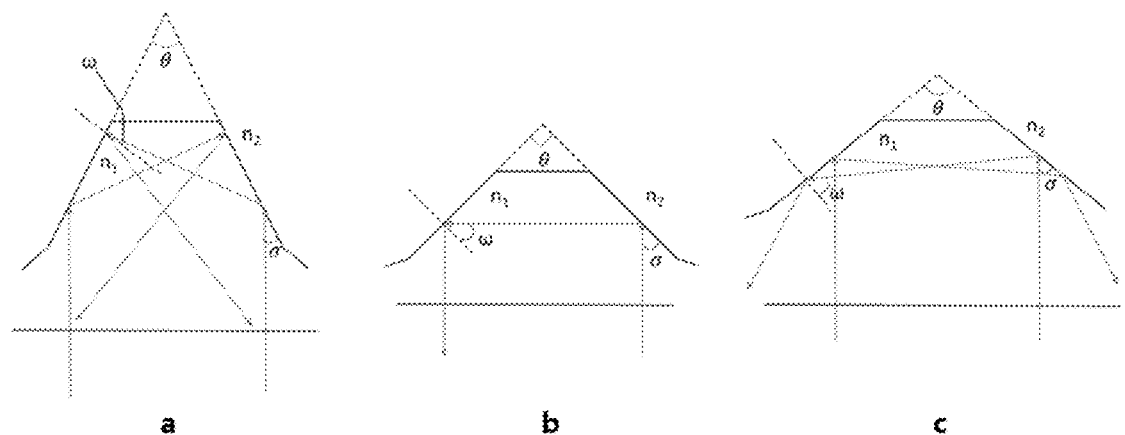
FIG. 8 illustrates a schematic diagram of a reflected light path of projection light on reflective planes of a microstructure unit obliquely opposite in a horizontal direction, when a projection screen according to a first embodiment of the present disclosure screen is used in a long-focus projector.

1.2.2 Arrangement and Function of Opposite Reflective Planes in the Horizontal Direction FIG. 8 illustrates a schematic diagram of the reflected light path of the projection light on the reflective planes 31 and 32 of the microstructure unit when the projection screen 100 is used in a long-focus projector.

The reflective planes 31 and 32 may be set for a light ray incident at a small incident angle, ideally, close to 0 degree, from the long-focus projector. Since the projection light ray is incident almost perpendicular to the screen plane, an angle between the inclined plane 31 and the screen plane may be equal to an angle between the inclined plane 32 and the screen plane. In FIG. 8, it is shown that an intersection angle of extension lines of the two planes 31 and 32 is θ, an angle between an incident projection light ray and the reflective plane is σ, and an incident angle of the intermediate light ray is co. In FIG. 8 a, b and c respectively show situations in which θ<90°, θ=90°, and θ>90°.

From the geometric relationship shown in FIG. 8, it can be derived:

$$\sigma = \theta/2 \quad (5)$$

$$\sigma = 90 + \omega - \theta \quad (6)$$

It can be derived from (5) and (6):

$$\omega = 3/2\theta - 90 \quad (7)$$

As in the foregoing, it is assumed that the refractive index of the reflective layer 30 is $n_1$, and the refractive index of the layer located at the inner side of the reflective layer 30, such as the spacer layer described in detail below, is $n_2$. Obviously, $n_2$ should be less than $n_1$. In order to satisfy the reflection conditions, there are:

$$90 - \sigma > \arcsin\left(\frac{n_2}{n_1}\right) \quad (8)$$

$$\omega > \arcsin\left(\frac{n_2}{n_1}\right) \quad (9)$$

Therefore, it can be concluded that the angle between the two reflective planes 31 and 32 satisfy the following relationship:

$$\frac{2}{3}\left(90 + \arcsin\left(\frac{n_2}{n_1}\right)\right) < \theta < 180 - 2\arcsin\left(\frac{n_2}{n_1}\right) \quad (10)$$

Considering that the refractive index of the common material of the reflective layer is 1.4 to 1.65, and material outside the reflective layer is air, that is, $n_3=1$, angle θ between the reflective planes 31 and 32 obtained from the above formula may range from 84° to 105°.

For example, assuming that the refractive index of the reflective layer is $n_2=1.53$, the angle between the reflective planes 31 and 32 may range from 87° to 98°.

Figure 9:
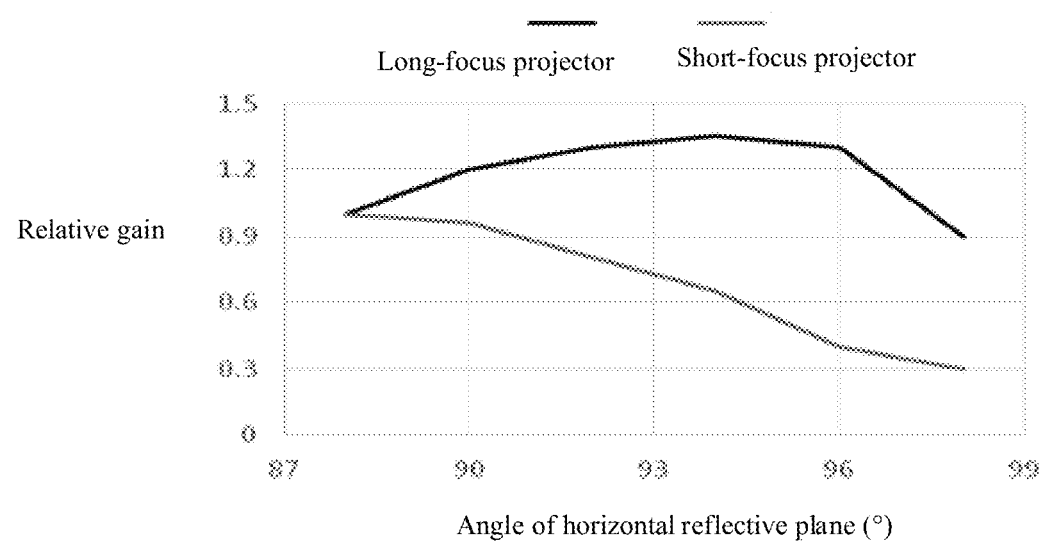
FIG. 9 illustrates a simulation diagram of a relative relationship between an angle between reflective planes 31 and 32 and a relative gain of a screen, when a screen according to embodiments of the present disclosure is used in a long-focus projector and a short-focus projector, respectively.

FIG. 9 shows a simulation diagram of the relative relationship between the relative gain of the screen and the angle between the reflective planes 31 and 32, when the screen according to the embodiment of the present disclosure is used in a long-focus projector and a short-focus projector. As shown in FIG. 9, in order to ensure the screen gain when the screen is used for short focus, a preferred range of angle θ may be 88°-93°.

Therefore, by setting the angle between the screen plane and reflective planes 31 and the angle between the screen plane and reflective planes 32 to be equal and the angle between the reflective planes 31 and 32 satisfied the above relationship, it is possible to make the projection light ray from the long-focus projector, ideally, the projection light ray incident almost perpendicular to the screen plane, reflected twice continuously thereon, and thus, the projection light ray is reflected to the audience side and incident into the viewer's view field.

1.2.3 Other Effects of the Reflective Plane

Figure 10:
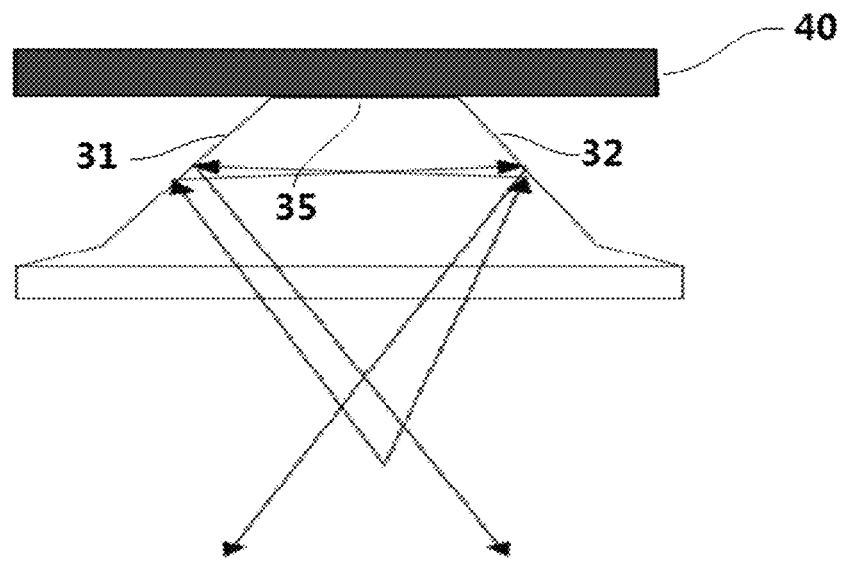
FIG. 10 illustrates a schematic diagram of a light path of projection light of a short-focus projector, incident on reflective planes obliquely opposite in a horizontal direction of a projection screen, according to a first embodiment of the present disclosure.
Figure 11:
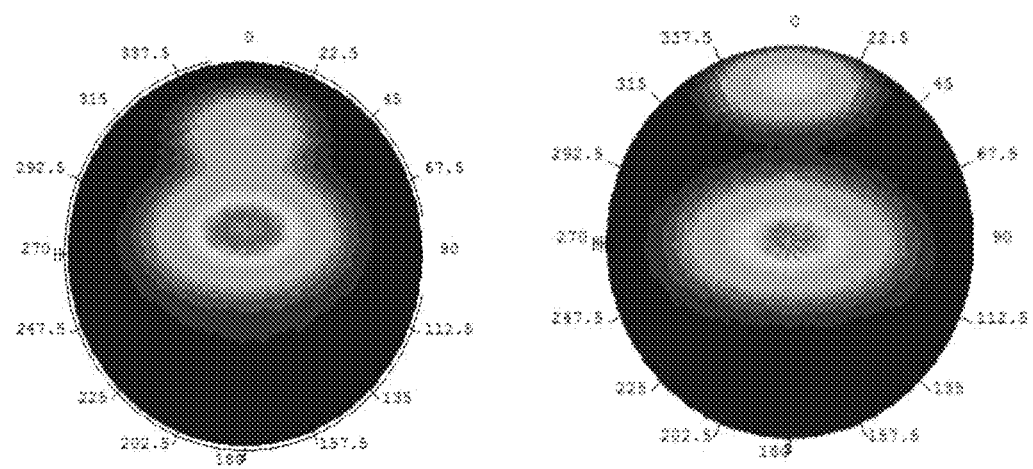
FIG. 11 illustrates a simulation result of a comparison of a horizontal viewing angle of a projection screen according to the present disclosure and a contrast projection screen.
Figure 12:
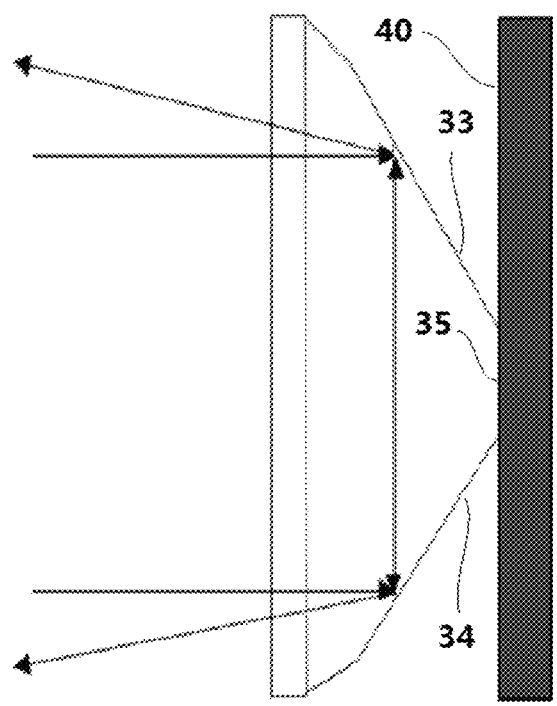
FIG. 12 illustrates a schematic diagram of a light path of projection light of a long-focus projector, incident on reflective planes obliquely opposite in a vertical direction of a projection screen, according to a first embodiment of the present disclosure.

FIG. 10 is a top view viewed from above the screen, showing a schematic diagram of the light path of the projection light of the short-focus projector incident on the horizontally inclined and opposite reflective planes of the projection screen according to the first embodiment of the present disclosure. When the light beam from the short-focus projector is incident onto the reflective planes 31 and 32 obliquely opposite in the horizontal direction of the projection screen 100 according to the first embodiment of the present disclosure, due to an incident angle of the light ray from the short-focus projector close to the screen is greater than an incident angle of an vertically incident light ray, therefore, as shown in FIG. 10, the light beam from the short-focus projector will be emitted in a larger angle range, i.e., larger than the light beam from a long-focus projector, after two total reflections or specular reflections on the reflective planes 31 and 32. FIG. 11 shows a simulation result of a comparison of a horizontal viewing angle of the projection screen according to the present disclosure and a comparison projection screen used in an ultra-short-focus projector. In FIG. 11, a left drawing is a simulation result of the horizontal viewing angle of the comparison projection screen with only vertical reflective planes 33 and 34, and a right drawing is a simulation result of the projection screen according to the present disclosure under the same conditions. It can be clearly seen from the comparison that when used in an ultra-short-focus projector, the projection screen according to the present disclosure has a larger horizontal viewing angle. Therefore, the two reflective planes obliquely opposite to each other in the horizontal direction may be applied to the long-focus projector as described above, and may increase the horizontal viewing angle of the screen when used to the short-focus projector FIG. 12 is a side view viewed from a screen side, showing a schematic diagram of the light path of projection light rays of the long-focus projector incident on the reflective planes of the projection screen obliquely opposite to each other in the vertical direction according to the first embodiment of the present disclosure. When the light beams from the long-focus projector are incident onto the reflective planes 33 and 34 that obliquely opposite to each other in the vertical direction of the projection screen 100 according to the first embodiment of the present disclosure, as shown in FIG. 12, the projection light rays from the long-focus projector almost vertically incident will be emitted in a larger angle range, i.e., larger than the projection light rays from the short-focus projector, after two total reflections on the reflective planes 33 and 34. Therefore, the two reflective planes obliquely opposite to each other in the vertical direction can be applied to ultra-short-focus projectors as described above, and can also increase the vertical viewing angle of the screen when the long-focus projector is used. For example, when such a projection screen is used in a large amphitheater or conference room, it can meet the viewing requirements of audiences sitting at different heights.

1.3 Improvement of Contrast

Currently, in the actual use of the projector, ambient light may be mainly from illumination light on the top above the screen, the illumination light from the side of the screen, or an outdoor light and a reflected light from the ground. As shown on the left side of FIG. 13, when ambient light rays are incident on the reflective layer 30 of the projection screen according to the first embodiment of the present disclosure from various directions, a part of the ambient light rays may be directly incident on the light absorption plane 35 of the microstructure unit. Since the light absorption plane 35 is in contact with the black light absorption layer 40 at the rear thereof, this part of the ambient light rays may be absorbed by the black light absorption layer 40 and will not affect a quality of a picture. In addition, another part of the ambient light rays is incident on the inclined planes 31-34. Most of this part of the ambient light rays may be reflected by the inclined planes 3134 to the light absorption plane 35, and then may be also absorbed by the black light absorption layer 40, and thus, the picture quality will not be affected.

Since the ambient light rays are mainly absorbed by the light absorption layer 40 through the light absorption plane 35, an aperture ratio (AR) of the reflective microstructure unit can be defined as follows.

Figure 13:
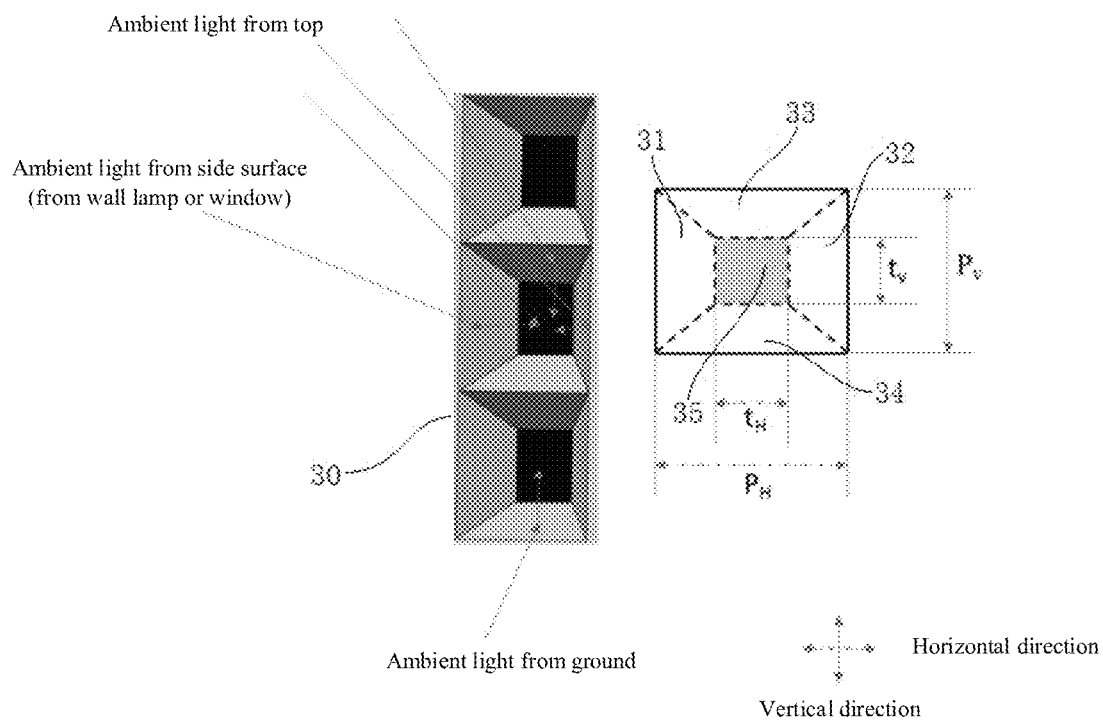
FIG. 13 illustrates a schematic diagram of improving contrast of a reflective microstructure unit of a projection screen according to a first embodiment of the present disclosure.

As shown on the right side of FIG. 13, a side length of the light absorption plane 35 of the microstructure unit in the horizontal direction may be set as $t_H$, a pitch in the horizontal direction may be set as $P_H$, a side length in the vertical direction may be set as $t_V$, and a pitch in the vertical direction may be set as $P_V$, then:

$$AR = \frac{t}{P} \quad (11)$$

The aperture ratio (AR) represents proportion of the black absorption of the reflective microstructure unit. Therefore, for the projection screen according to the first embodiment of the present disclosure, the reflective microstructure unit has an AR parameter in the horizontal direction and in the vertical direction, respectively.

$$AR_H = \frac{t_H}{P_H} \quad (12)$$

$$AR_V = \frac{t_V}{P_V} \quad (13)$$

The size of the aperture ratio determines the contrast of the screen. Therefore, structural parameters of each trapezoidal TIR microstructure unit can be determined through the above formulas (4), (10), (12), (13), comprehensively considering the screen gain and the contrast.

Figure 14:
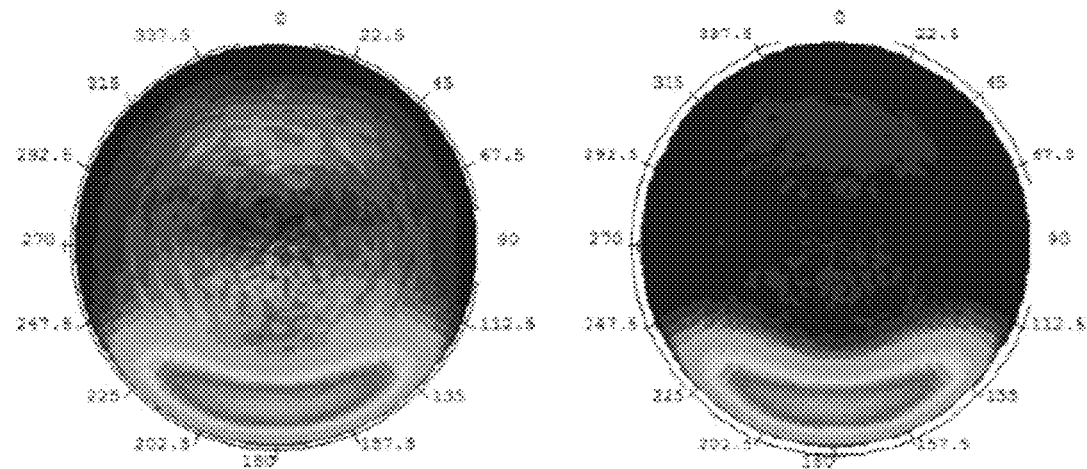
FIG. 14 illustrates a simulation diagram of contrast of a projection screen according to the present disclosure.
Figure 15:
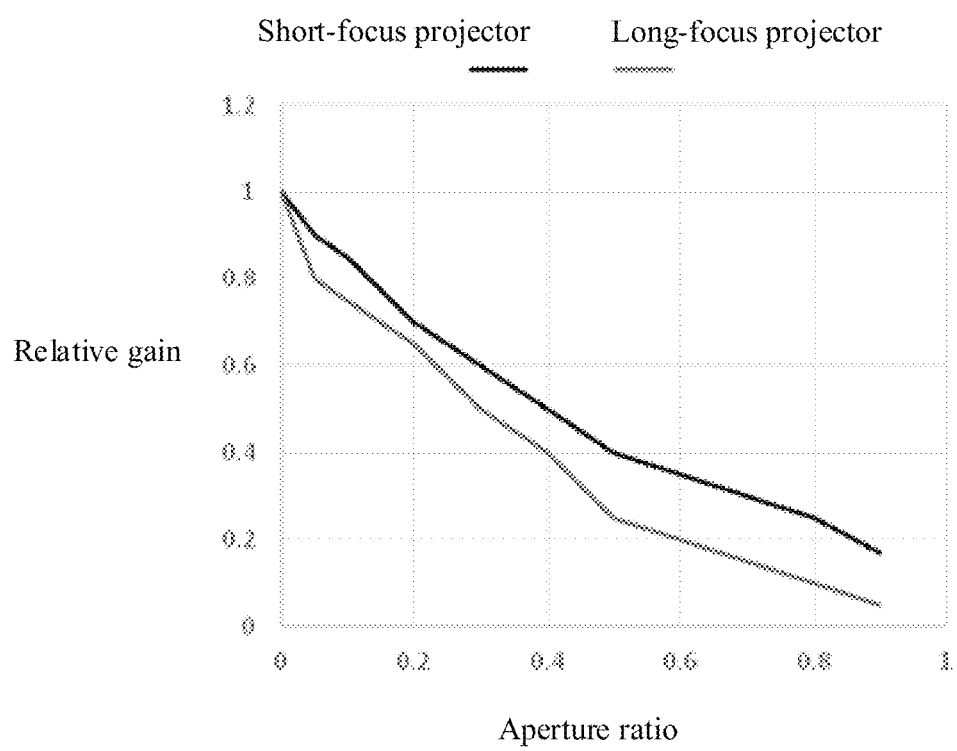
FIG. 15 illustrates a simulation diagram of a relationship between a aperture ratio of a microstructure of a projection screen and a relative gain of a screen according to the present disclosure.
Figure 16:
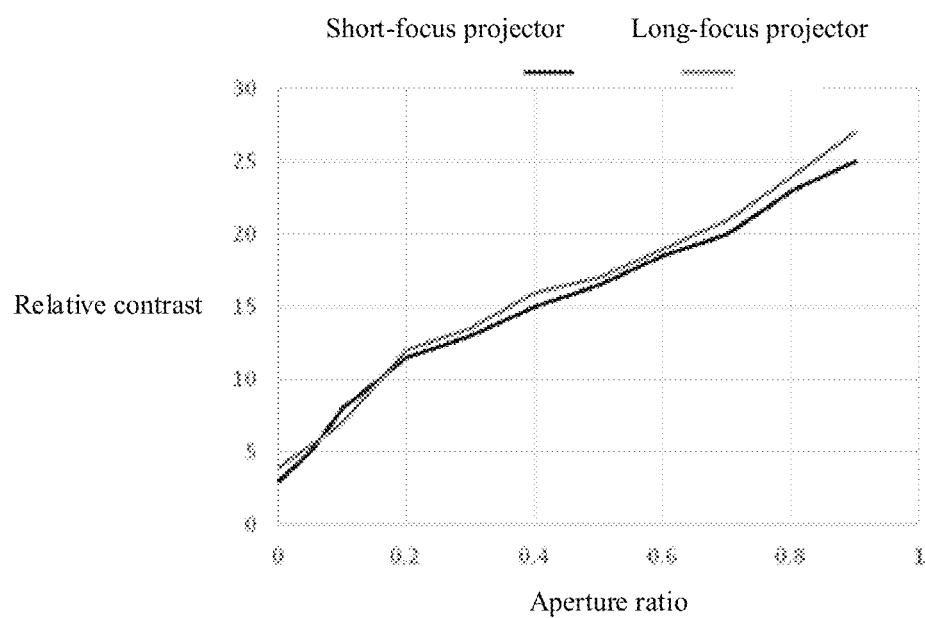
FIG. 16 illustrates a simulation diagram of a relationship between a aperture ratio of a microstructure of a projection screen and a relative contrast of a screen according to the present disclosure.

It should be noted that when the projection screen 100 according to the first embodiment of the present disclosure is used in the long-focus projector, an angel of an ambient light ray coming from the ground incident on the reflective planes obliquely opposite to each other in the reflective microstructure unit in the vertical direction may be different from the incident angle of the projection light coming from the short-focus projector. Therefore, a part of the ambient light ray coming from the ground may be absorbed by the black light absorption layer 40, and a part may be reflected in other directions, which will not affect the viewer's view field. The projection screen 100 according to the first embodiment of the present disclosure, thus, has a more remarkable anti-ambient light effect when used in a long-focus projector. Therefore, comprehensively considering the gain and contrast, the aperture ratio in the horizontal direction can be less than the aperture ratio in the vertical direction. FIG. 14 is the light distribution of simulated ambient light when different aperture ratio parameters are provided. The left view of FIG. 14 shows the simulation result when $AR_H$ and $AR_V$ are both 0, that is, the reflection results when the reflective microstructure has a shape of quadrangular pyramid (this situation will be explained below). From the view, most of the ambient light may be reflected to the ground after being reflected several times on the screen, but some of the ambient light will still be into the viewer's view field, thus, affecting the viewing contrast. The right view of FIG. 14 shows the simulation result when the $AR_H$ is 0.45 and the $AR_V$ is 0.5. From the view, it can be seen that the influence of the ambient light on the contrast may be significantly reduced. In addition, FIG. 15 shows a simulation diagram of a relationship between the aperture ratio of the microstructure of the projection screen and a relative gain of the screen according to the present disclosure. FIG. 16 shows a simulation diagram of a relationship between the aperture ratio of the microstructure of the projection screen and a relative contrast of the screen according to the present disclosure. It should be noted that the relative gain shown in FIG. 15 and the relative contrast shown in FIG. 16 are both relative values converted with reference to reference values. It can be seen from the simulation results shown in FIG. 15 and FIG. 16 that in this embodiment, selectable ranges of $AR_H$ and $AR_V$ may be 0.05-0.9, and preferably 0.1-0.5.

1.4 Arrangement of Reflective Microstructure Units

Figure 17:
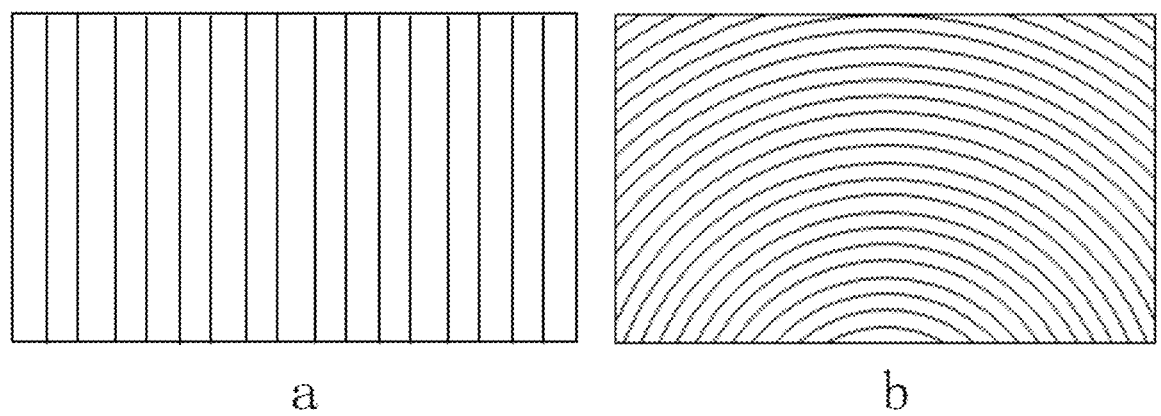
FIG. 17 illustrates an example of an arrangement of reflective microstructure units of a projection screen according to the present disclosure.

In the projection screen according to the first embodiment of the present disclosure shown in FIG. 3, reflective microstructure units may be arranged in a two-dimensional matrix array in the horizontal direction and in the vertical direction. For example, view a of FIG. 17 shows a wire grid structure commonly used in long-focus projection screens. However, the arrangements of the reflective microstructure units are not limited. View b of FIG. 17 illustrates another arrangement of the microstructure units in the projection screen according to the present disclosure. As shown in view b of FIG. 17, the microstructure units in the reflective layer may be arranged in an annular configuration in a rotationally symmetrical manner relative to a point in a center below the screen. That is, a rotation center axis of the microstructure unit is perpendicular to the projection screen and intersects with the projection screen in the center below of the projection screen. The projection screen with this arrangement may be more suitable for short-focus projectors. In addition, it is easy to understand that when the microstructure units in the reflective layer need to adopt the annular configuration shown in view b of FIG. 17, the shape of the front view of each microstructure unit will no longer be rectangle as shown in FIG. 3 and FIG. 4, but a trapezoid with a slightly longer length at the top and a slightly shorter length at the bottom. However, in this case, the settings and function of the inclination angles of the reflecting surfaces 31 to 34 and the light absorption plane 35 described in detail above will not be changed, and therefore, repeated description of the details will be omitted.

1.5 Light Absorption Layer and Light Diffusion Layer

Figure 18:
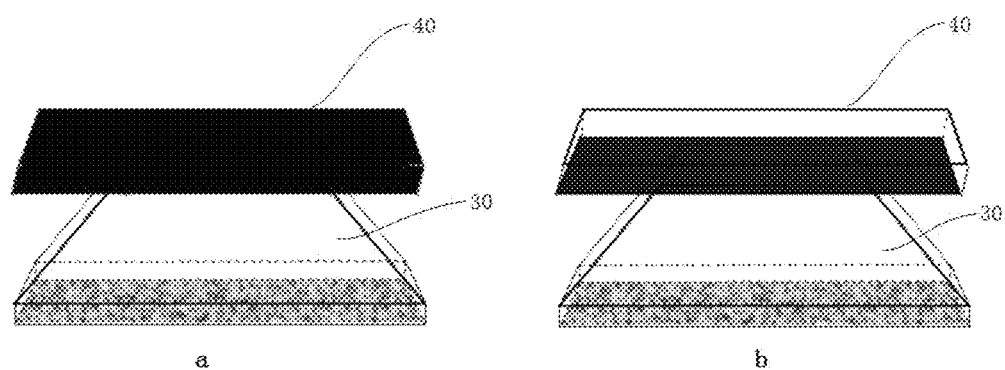
FIG. 18 illustrates a structural example of a light absorption layer of a projection screen according to a first embodiment of the present disclosure.

The light absorption layer 40 may be located on the inner side of the reflective layer 30. The light absorption layer 40 may be a black light absorption layer. The black light absorption layer here may be a pure black film/plate/cloth material formed by extrusion molding, coating, spraying, or the like. The black light absorption layer 40 glued with the light absorption plane 35 of the reflective microstructure unit of the reflective layer 30, as shown in view a of FIG. 18. The glue is evenly coated on the surface of the black light absorption layer. The components of the glue may be a mixture of resins, additives and solvents in a certain proportion. In addition, as shown in view b of FIG. 18, it can also be achieved by first coating the mixed viscous glue containing black dye on a substrate, and then adhering the substrate to the light absorption plane 35 of the reflective microstructure unit of the reflective layer 30, so as to prepare a black light absorption layer 40 and to bond a reflective layer 30. Among them, the substrate may be polyimide (PI) film, polyester (PET) film, polynaphthyl ester (PEN) film, polyvinyl chloride (PVC) film, polycarbonate (PC) film or liquid crystal polymer (LCP)) Film, etc., or glass plate/PC board/cloth, etc.

Figure 19:
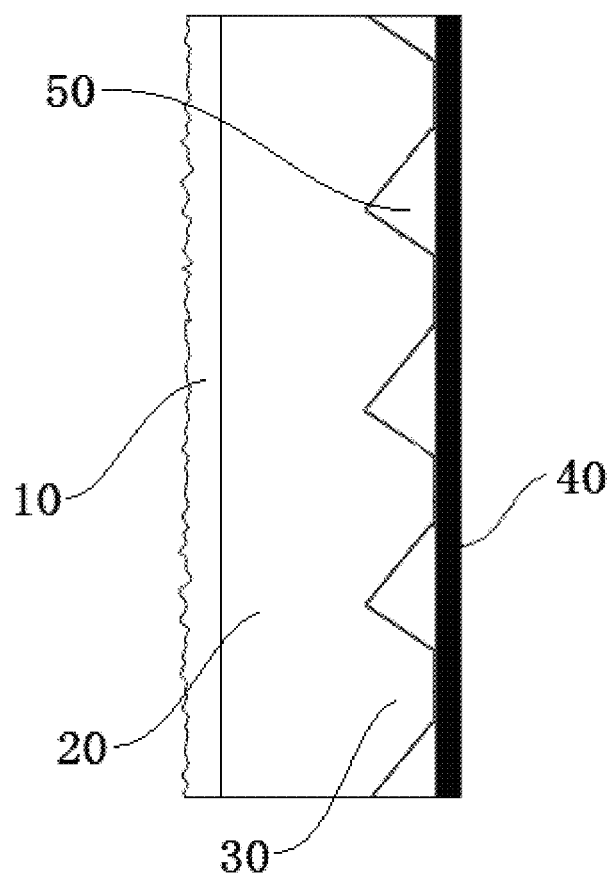
FIG. 19 illustrates a side view of an exemplary structure of a projection screen according to a first embodiment of the present disclosure.

It should be noted that since the microstructure unit of the reflective layer has a three-dimensional truncated pyramid, when the light absorption layer 40 is adhered to the light absorption plane 35 of the reflective microstructure unit of the reflective layer 30, a contacting surface between a part of the light absorption layer 40 and the reflective layer 30 is not flat. In other words, a part of the surface of the light absorption layer 40 may be not in direct contact with the reflective layer 30. In this case, in the side view as shown FIG. 19, there may be a spacer layer 50 between the light absorption layer 40 and a part of the reflective layer 30 other than the light absorption plane 35. The spacer layer 50 may be a planarization layer formed of materials such as glue, or may be an air gap. In the case where the spacer layer 50 is glue, the glue may be first coated on each microstructure unit of the reflective layer 30, then be scraped flat, and then bonded with the light absorption layer 40. As described above, a refractive index $n_2$ of the spacer layer 50 may be less than the refractive index $n_1$ of the reflective layer 30.

The light diffusion layer 10 may be located on an audience side of the substrate layer 20 which is close to the audience. The light diffusion layer 10 may be prepared on the audience side of the substrate layer 20 by a method of hot embossing or UV glue transfer. In this case, the light diffusion layer 10 and the reflective layer 30 may be respectively formed on opposite sides of the same substrate layer 20, and the light diffusion layer 10, the substrate layer 20 and the reflective layer 30 may be integrally formed, as shown in view a of FIG. 20. The substrate may include organic materials such as PET, PC, PVC, PMMA, etc. In addition, the light diffusion layer 10 can also be prepared on a transparent substrate different from the substrate layer 20 by hot embossing or UV glue transfer, and then the transparent substrate can be bonded to the substrate layer 20 by UV glue or thermosetting glue.

Figure 20:
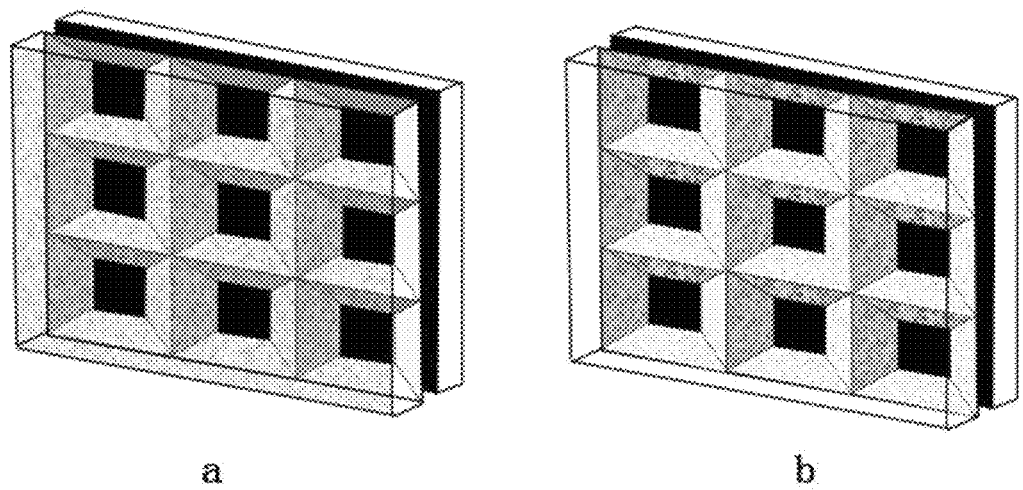
FIG. 20 illustrates a schematic diagram of a light diffusing structure of a projection screen according to the present disclosure.

Alternatively, distinguish form providing a light diffusion layer 10, as shown in view b of FIG. 20, the surface of the reflective microstructure may be directly roughened to obtain a light diffusing surface with a light diffusing function. The reflective microstructure increases the viewing angle while reflecting light. The light diffusion layer and the light diffusing surface can be collectively referred to as a light diffusing structure.

2 Second Embodiment

The projection screen according to a second embodiment of the present disclosure will be described below with reference to FIGS. 21 to 25.

Figure 21:
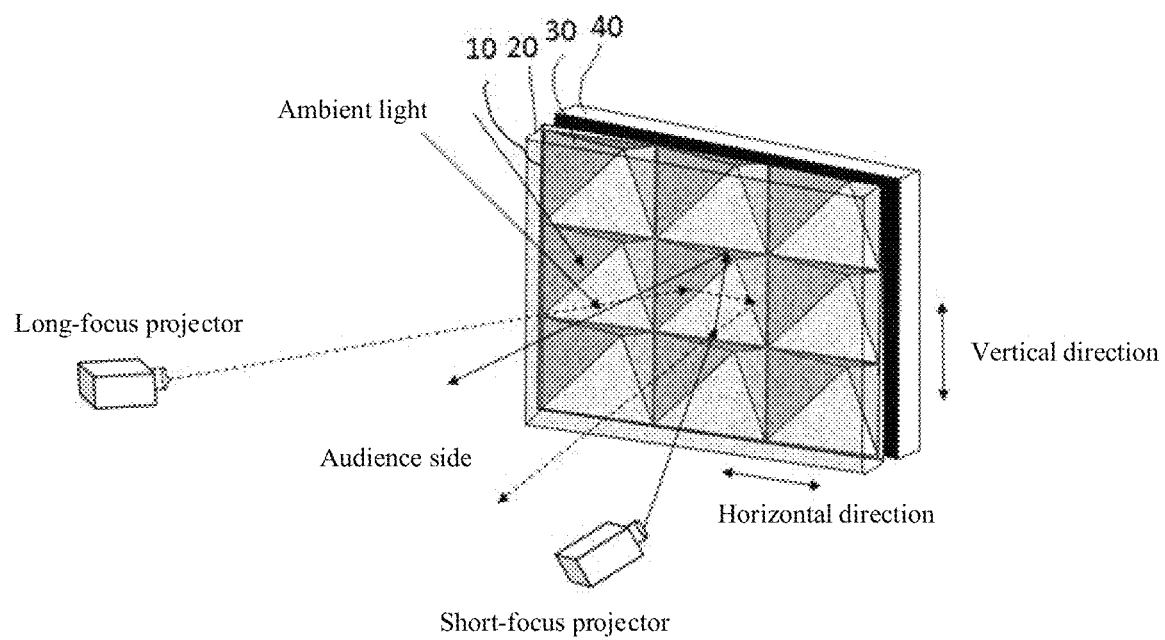
FIG. 21 illustrates a perspective view of an exemplary structure of a projection screen according to a second embodiment of the present disclosure.
Figure 22:
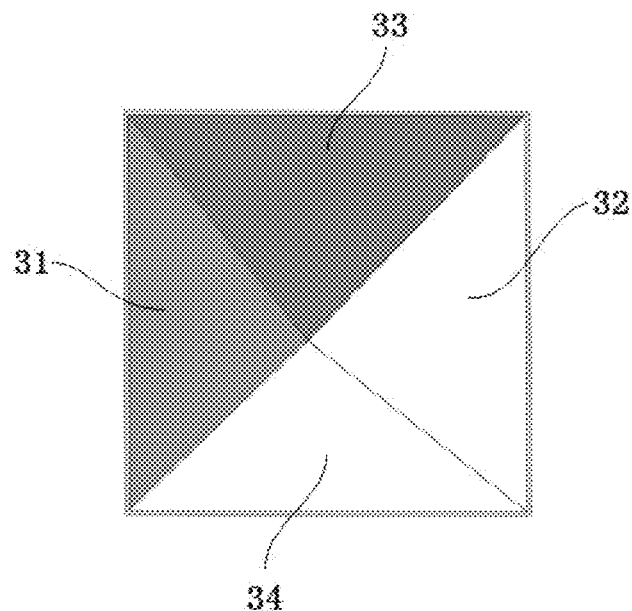
FIG. 22 illustrates a structural schematic diagram of a reflective unit of a projection screen according to a second embodiment of the present disclosure.

FIG. 21 is a perspective view showing a projection screen according to the second embodiment of the present disclosure. As shown in FIG. 21, the projection screen 200 may include a light diffusion layer 10, a substrate layer 20, a reflective layer 30, and a light absorption layer 40 sequentially stacked from an audience side, i.e., an incident side of projection light. The reflective layer 30 may be provided with a plurality of microstructure units, and these microstructure units may be arranged in a two-dimensional manner to form a microstructure unit array. The difference between the projection screen 200 of the second embodiment and the projection screen 100 of the first embodiment mainly lies in a specific structure of the reflective microstructure unit. As shown in FIGS. 21 and 22, the reflective microstructure unit of the projection screen 200 of the second embodiment has a quadrangular pyramid structure. That is, as mentioned above, in the second embodiment, the aperture ratios (AR) of the microstructure units may be zero. Specifically, a pair of reflective planes 31 and 32 obliquely opposite in the horizontal direction and a pair of reflective planes 33 and 34 obliquely opposite in the vertical direction directly intersect on a side away from the audience to form a quadrangular pyramid structure. In this case, a light absorption plane 35 is not provided in the reflective microstructure unit according to this embodiment. Without the light absorption plane 35, when the incident ambient light does not satisfy the condition of the reflection, part of the incident ambient light will pass through one of the reflective planes 31-34 to be absorbed by the light absorption layer inside, and part of the incident ambient light will be reflected to the other areas outside of the view's view field. As such, it will achieve an effect of anti-ambient light.

Figure 24:
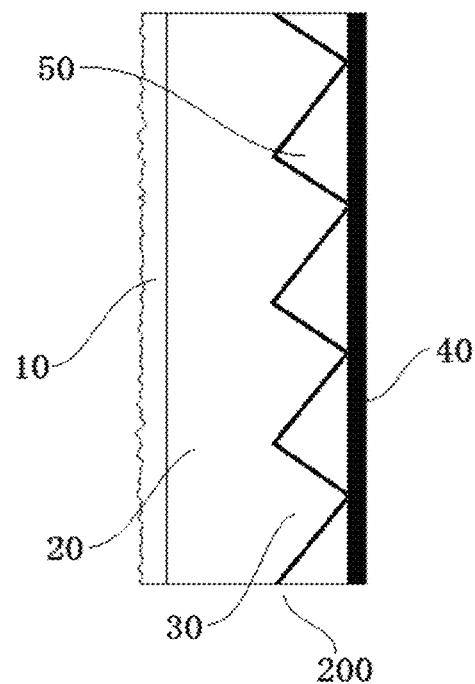
FIG. 24 illustrates an example for bonding of a light absorption layer of a projection screen according to the present disclosure.
Figure 25:
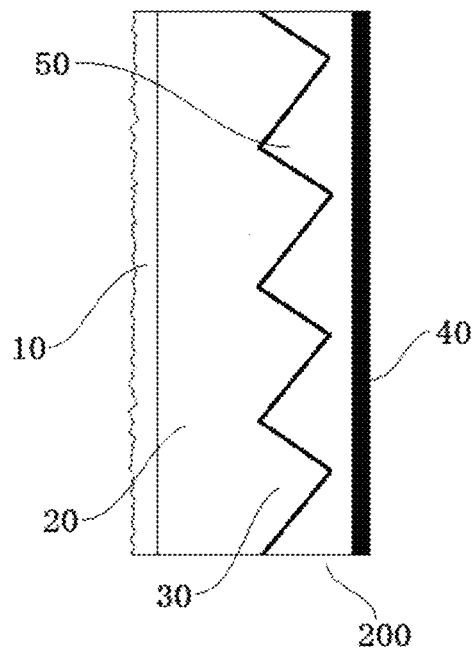
FIG. 25 illustrates another example for bonding a light absorption layer of a projection screen according to the present disclosure.

In addition, as shown in the side view in FIG. 24, the light absorption layer 40 may be directly bonded to apexes of each of reflective microstructure units, i.e., an intersection of the reflective planes 31 to 34. Alternatively, in a side view as shown in FIG. 25, the light absorption layer 40 may be in contact with the spacer layer 50 and may be adhered to the spacer layer 50.

Except for the above, the projection screen 200 according to the second embodiment and the projection screen 100 according to the first embodiment are the same in principles, structure, materials, etc., and thus repeated descriptions will be omitted here.

Figure 23:
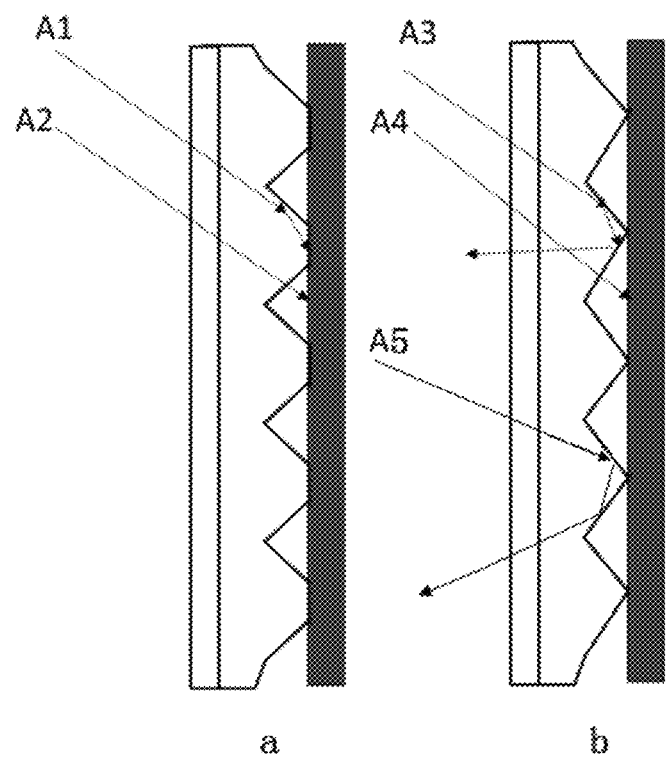
FIG. 23 illustrates cross sections of a projection screen according to a first embodiment and a second embodiment of the present disclosure.

Views a and b of FIG. 23 respectively show cross sections along the vertical direction, of a microstructure unit with a truncated pyramid structure according to the projection screen 100 of the first embodiment and a microstructure unit with a quadrangular pyramid structure according to the projection screen 200 of the second embodiment. For the truncated pyramid structure in the first embodiment, as shown in view a of FIG. 23, a part of an ambient light ray A2 passes through the reflective surface and may be absorbed by the light absorption layer. In addition, due to its aperture, another part of the ambient light ray A1 may be reflected by the reflective surface and then also absorbed by the light absorption layer. Therefore, when the total reflective microstructure unit is adopted, the ambient light rays can be fully absorbed, the contrast may be better, but the gain may be lower than that of the pyramid structure without aperture. For the pyramid structure in the second embodiment, as shown in view b of FIG. 23, a part of an ambient light ray A4 passes through the reflective surface and may be absorbed by the light absorption layer at the rear. In addition, a part of a light ray A5 may be reflected toward the ground, which will not affect the viewing. However, there is still a part of the ambient light ray A3 satisfies the reflection conditions and is reflected into the viewer's view field. Therefore, the pyramid structure in the second embodiment is relatively weak in contrast, but the gain is higher. From the above comparison, the projection screen 100 of the first embodiment can better absorb ambient light and can obtain high contrast due to the light absorption plane 35, however, part of the projected light will be also absorbed by the light absorption plane 35, and thus, affecting the screen gain. In contrast, as mentioned above, the projection screen 200 of the second embodiment is easy to achieve a higher screen gain, but has a lower ability of absorbing the ambient light than the projection screen 100 of the first embodiment. Therefore, the projection screen according to the first embodiment of the present disclosure has a suitable gain and high contrast, while the projection screen according to the second embodiment of the present disclosure has a suitable contrast and high gain. In general, the structure of the projection screen according to the first embodiment of the present disclosure is preferable. In addition, it should be understood that the structure of the microstructure unit of the present disclosure is not limited to the specific structure described in the above-mentioned embodiment, but all feasible structures are acceptable, as long as they have a pair of a first and a second planes set for the projecting light from a long-focus projector that is incident at a first incident angle within a first angle range, and a pair of a third and a fourth planes set for the projection light from short-focus or ultra-short-focus projectors that is incident at a second incident angle within a second angle range. In addition, the first direction above-mentioned is not limited to the horizontal direction, and the second direction above-mentioned is not limited to the vertical direction, and the two directions can be interchanged, or can be any two directions orthogonal to each other.

The projection screen and the projection system according to the present disclosure have at least the following advantages:

(1) By forming a microstructure unit with two pairs of different reflective planes in the reflective layer, both the projection light from the ultra-short-focus projector and the projection light from the long-focus projector can be reflected by the screen to within the viewer's view field, such that a single screen can be used for both an ultra-short-focus projector and a long-focus projector.

(2) When used for the projection screen of the long-focus projector, two reflective planes arranged oppositely in the horizontal direction play a role of reflecting the projection light, and two reflective planes arranged in the vertical direction can increase the vertical viewing angle of the screen. When used in the projection screen of the ultra-short-focus projector, the two reflective planes arranged in the vertical direction mainly play a role of reflecting the projection light, and the two reflective planes arranged in the horizontal direction can increase the horizontal viewing angle of the screen.

(3) By providing apertures in the microstructure unit of the reflective layer and exposing a black light absorption layer at the apertures, it can resist ambient light from all directions, and thus the effect of resisting ambient light may be better and the contrast of the projection screen may be further improved.

It should be understood that the beneficial effects of the present disclosure are not limited to the above-mentioned effects, but may be any beneficial effects described herein.

Although the projection screen and the projection system according to the present disclosure have been described above with reference to the accompanying drawings, the present disclosure is not limited thereto, and those skilled in the art should understand that without departing from the essence defined by the appended claims of the present disclosure, various changes, combinations, sub-combinations, and modifications can be made.

The invention claimed is:

1. A projection screen, comprising a reflective layer and a light absorption layer for absorbing light, which are provided in sequence from an incident side of projection light,
wherein the reflective layer comprises a plurality of microstructure units, and each of the plurality of microstructure units comprises a first plane and a second plane that are obliquely opposite in a first direction, and a third plane and a fourth plane that are obliquely opposite in a second direction;
wherein the first plane and the second plane are arranged with inclination angles relative to a screen plane of the projection screen such that at least a part of the projection light incident at a first incident angle within a first angle range is reflected at the first plane and the second plane to enter into a field of view of a viewer;
wherein the third plane and the fourth plane are arranged with inclination angles relative to a screen plane of the projection screen such that at least a part of the projection light incident at a second incident angle within a second angle range is reflected at the third plane and the fourth plane to enter into the field of view of the viewer; and
wherein the first incident angle is less than the second incident angle.

2. The projection screen according to claim 1, wherein the microstructure unit further comprises a light absorption plane parallel to the screen plane and in contact with the light absorption layer, and the light absorption plane intersects with the first plane, the second plane, the third plane and the fourth plane to form a truncated quadrangular pyramid shape.

3. The projection screen according to claim 2, wherein assuming that a ratio of an edge length of the light absorption plane in the second direction to a pitch of the microstructure units in the second direction is $AR_V$, then $0.05 \leq AR_V \leq 0.9$; and
assuming that a ratio of an edge length of the light absorption plane in the first direction to a pitch of the microstructure units in the first direction is $AR_H$, then $0.05 \leq AR_H \leq 0.9$.

4. The projection screen according to claim 2, wherein assuming that a ratio of an edge length of the light absorption plane in the second direction to a pitch of the microstructure units in the second direction is $AR_V$, then $0.1 \leq AR_V \leq 0.5$; and
assuming that a ratio of an edge length of the light absorption plane in the first direction to a pitch of the microstructure units in the first direction is $AR_H$, then $0.1 \leq AR_H \leq 0.5$.

5. The projection screen according to claim 1, wherein the first plane, the second plane, the third plane, and the fourth plane intersect at a side close to the light absorption layer and form a quadrangular pyramid shape.

6. The projection screen according to claim 1, wherein a spacer layer is provided between the light absorption layer and the reflective layer,
wherein the spacer layer is made of glue, and
wherein a refractive index of the spacer layer is less than a refractive index of the reflective layer.

7. The projection screen according to claim 1, wherein the projection screen further comprises a light diffusing structure, and wherein the light diffusing structure is a light diffusion layer provided on the reflective layer at the incident side of the projection light.

8. The projection screen according to claim 1, wherein the projection screen further comprises a substrate layer, and the substrate layer is arranged at a side of the substrate layer close to the light absorption layer and formed integrally with the reflective layer by a roll to roll coating resin process and a UV curing process.

9. The projection screen according to claim 1, wherein assuming that the inclination angles of the third plane and the fourth plane relative to the screen plane are respectively $\theta_1$ and $\theta_2$, then $\theta_1$ and $\theta_2$ satisfy a relationship of $\theta_1 + \theta_2 < 90°$.

10. The projection screen according to claim 1, wherein an angle between the third plane and the fourth plane ranges from 101° to 110°.

11. The projection screen according to claim 1, wherein an angle between the first plane and the second plane ranges from 84° to 105°.

12. The projection screen according to claim 11, wherein the angle between the first plane and the second plane ranges from 88° to 93°.

13. The projection screen according to claim 1, wherein the microstructure units in the reflective layer are arranged in the first and second directions in an arrangement of a two-dimensional matrix.

14. The projection screen according to claim 1, wherein a spacer layer is provided between the light absorption layer and the reflective layer,
   wherein the spacer layer is an air gap, and
   wherein a refractive index of the spacer layer is less than a refractive index of the reflective layer.

15. The projection screen according to claim 1, wherein the projection screen further comprises a light diffusing structure, and wherein the light diffusing structure is a roughened surface of the microstructure unit.

16. The projection screen according to claim 1, wherein an angle between the first plane and the second plane ranges from 87° to 98°.

17. The projection screen according to claim 1, wherein the microstructure units in the reflective layer are arranged as a ring shape in a rotationally symmetric manner, and a rotation center axis is perpendicular to the projection screen and intersects with the projection screen in a center below the projection screen.

18. A projection system, comprising a projection screen and a projector, wherein the projection screen comprises a reflective layer and a light absorption layer for absorbing light, which are provided in sequence from an incident side of projection light,
   wherein the reflective layer comprises a plurality of microstructure units, and each of the plurality of microstructure units comprises a first plane and a second plane that are obliquely opposite in a first direction, and a third plane and a fourth plane that are obliquely opposite in a second direction;
   wherein the first plane and the second plane are arranged with inclination angles relative to a screen plane of the projection screen such that at least a part of the projection light incident at a first incident angle within a first angle range is reflected at the first plane and the second plane to enter into a field of view of a viewer;
   wherein the third plane and the fourth plane are arranged with inclination angles relative to a screen plane of the projection screen such that at least a part of the projection light incident at a second incident angle within a second angle range is reflected at the third plane and the fourth plane to enter into the field of view of the viewer; and
   wherein the first incident angle is less than the second incident angle.

19. The projection system according to claim 18, wherein the projector is a long-focus projector, and the projection light from the long-focus projector is incident onto the projection screen at the first incident angle within the first angle range.

20. The projection system according to claim 18, wherein the projector is a short-focus or an ultra-short-focus projector located below the projection screen, and the projection light from the short-focus projector or the ultra-short-focus projector is incident onto the projection screen at the second incident angle within the second angle range.

* * * * *